United States Patent [19]

Warner et al.

[11] Patent Number: 5,274,654
[45] Date of Patent: Dec. 28, 1993

[54] LASER BEAM GENERATING APPARATUS

[75] Inventors: Bruce E. Warner, Livermore; David B. Duncan, Auburn, both of Calif.

[73] Assignee: The United States of America as represented by the United States Department of Energy, Washington, D.C.

[21] Appl. No.: 218,200

[22] Filed: Jul. 7, 1988

Related U.S. Application Data

[63] Continuation-in-part of Ser. No. 915,205, Sep. 25, 1986, abandoned.

[51] Int. Cl.⁵ .............................................. H04L 1/14
[52] U.S. Cl. ........................................ 372/34; 372/56; 372/61
[58] Field of Search ................... 330/4.3; 372/30, 34, 372/61, 98, 56

[56] References Cited

U.S. PATENT DOCUMENTS

| | | |
|---|---|---|
| 3,740,662 | 6/1973 | Farcy et al. |
| 3,829,792 | 8/1974 | Born et al. |
| 3,875,531 | 4/1975 | Buczek et al. |
| 4,008,445 | 2/1977 | Hernquist .................. 330/4.3 X |
| 4,611,329 | 9/1986 | Ernst et al. ................. 372/34 X |

*Primary Examiner*—Mark Hellner
*Attorney, Agent, or Firm*—Miguel A. Valdes; Roger S. Gaither; William R. Moser

[57] ABSTRACT

Laser beam generating apparatus including a septum segment disposed longitudinally within the tubular structure of the apparatus. The septum provides for radiatively dissipating heat buildup within the tubular structure and for generating relatively uniform laser beam pulses so as to minimize or eliminate radial pulse delays (the chevron effect).

8 Claims, 5 Drawing Sheets

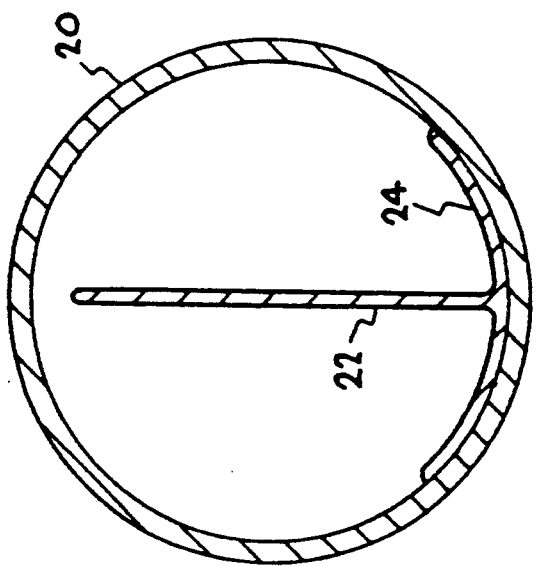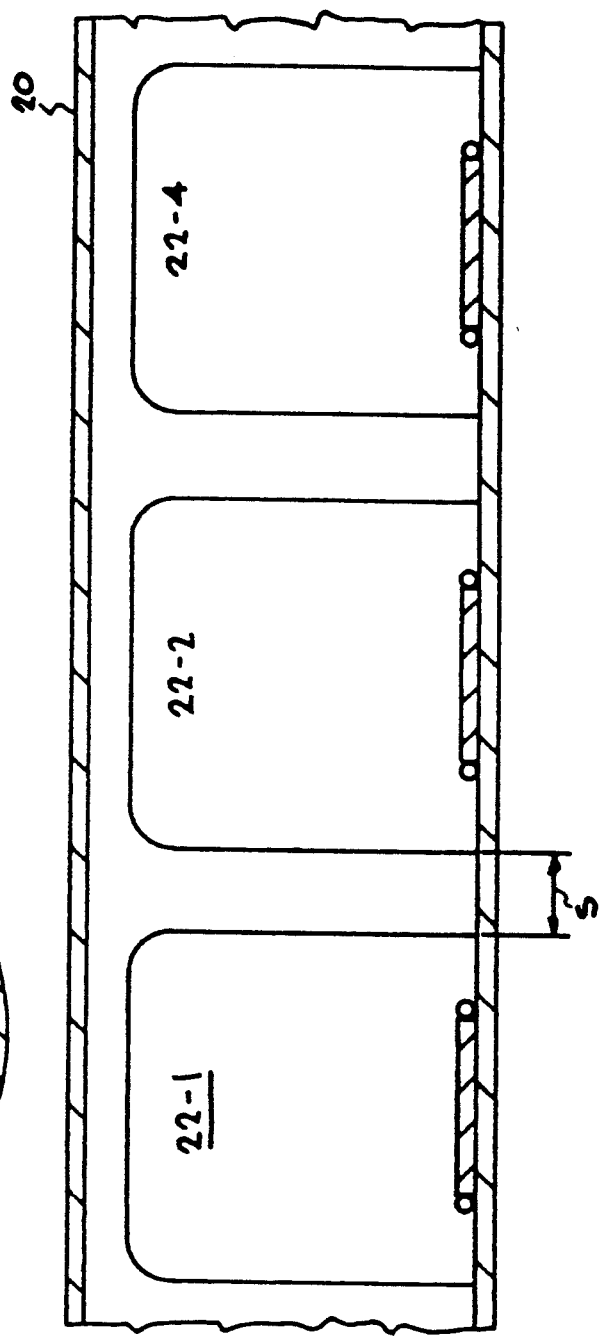

LASER BEAM GENERATING APPARATUS

FIELD OF THE INVENTION

The United States Government has rights in this invention pursuant to Contract No. W-7405-ENG-48 between the United States Department of Energy and University of California for the operation of the Lawrence Livermore National Laboratory.

CROSS-REFERENCE TO RELATED APPLICATIONS

The present application is a continuation-in-part of co-pending application entitled Improved Laser Beam Generating Apparatus, Ser. No. 915,205, filed Sep. 25, 1986, now abandoned.

BACKGROUND OF THE INVENTION

The present invention relates to an improved laser beam pulse generating apparatus and more particularly for use with a metal-vapor laser such as a copper vapor laser.

The copper vapor laser CVL is one of a number of electric-discharge-excited metal-vapor lasers that are characterized by laser transitions from an excited state to a lowlying metastable state. Laser oscillator power in CVLs has been increased from the milliwatt level to hundreds of watts at operating ranges of 5-20 kilohertz (or more).

The increase in power levels has resulted, in part, by increasing the diameter of the CVL discharge tube. However, with the increase in the diameter of a CVL discharge tube, problems have been encountered which affect the output power levels.

One effect is known as radial dynamics, which limits the uniform buildup of a laser pulse from the outside of the discharge tube to the center. See, for example, the article by M. J. Kushner and B. E. Warner entitled "Large-Bore Copper-Vapor Lasers: Kinetics and Scaling Issues," J. Appl. Phys. 54(6) 1983, p.2970. Because of the radial dynamics effect, the leading edge of the laser pulse increases in intensity with time from the outside of the discharge tube to its center. This results in the generation of a nonuniform pulse having what can be characterized as a chevron shaped intensity pattern with respect to time. This can seriously affect the proper operation of any system utilizing a CVL having high power, high repetition rate laser pulse outputs which are supposed to be uniform in intensity. Moreover, with high power, high repetition rate CVL systems, heat buildup within the tubular structure can still further limit the usable discharge tube diameter by thermally populating the metastable lower laser level. The heat buildup problem can further limit the desired increased higher power level of such a CVL system.

SUMMARY OF THE INVENTION

It is an object of the present invention to provide an improved laser beam pulse generating apparatus.

It is a further object to generate laser beam pulses which are relatively uniform in intensity in cross-section, including the leading and trailing edges.

It is another object of the present invention to avoid heat buildup problems.

It is still another object of the present invention to provide an improved apparatus which permits higher power and high repetition rate implementations with laser systems.

Briefly, the present invention includes apparatus for generating a series of laser beam pulses. The apparatus includes a generally tubular laser structure for generating the series of laser pulses where the structure includes means for applying a pulsating electric field which radially penetrates the laser structure so as to generate the series of laser pulses.

The structure further includes means for radiatively dissipating heat buildup at predetermined locations inside the tubular structure.

The structure further includes means for causing each of the laser beam pulses to have an intensity pattern which is substantially uniform in cross-section during its temporal output, including its leading and trailing edges, thereby to minimize or eliminate the "chevron effect" of prior art systems.

The apparatus includes one or more septum segments disposed longitudinally within the laser structure.

According to another aspect of the present invention, the structure further includes a slide-in capability of the segments into the discharge tube.

Additional objects, advantages and novel features of the present invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate a preferred embodiment of the invention and, together with the description, serve to explain the principles of the invention.

FIG. 3 depicts a cross-section of an improved laser beam generating apparatus according to the present invention.

FIG. 4 depicts another cross-sectional longitudinal view of the improved laser beam generating apparatus according to the present invention.

DETAILED DESCRIPTION OF THE DRAWINGS

Reference will now be made in detail to the preferred embodiment of the invention, an example of which is illustrated in the accompanying drawings. While the invention will be described in connection with the preferred embodiment; it will be understood that it is not intended to limit the invention to that embodiment. On the contrary, it is intended to cover all alternatives, modifications and equivalents as may be included with the spirit and scope of the invention as defined by the appended claims.

Figure 1:
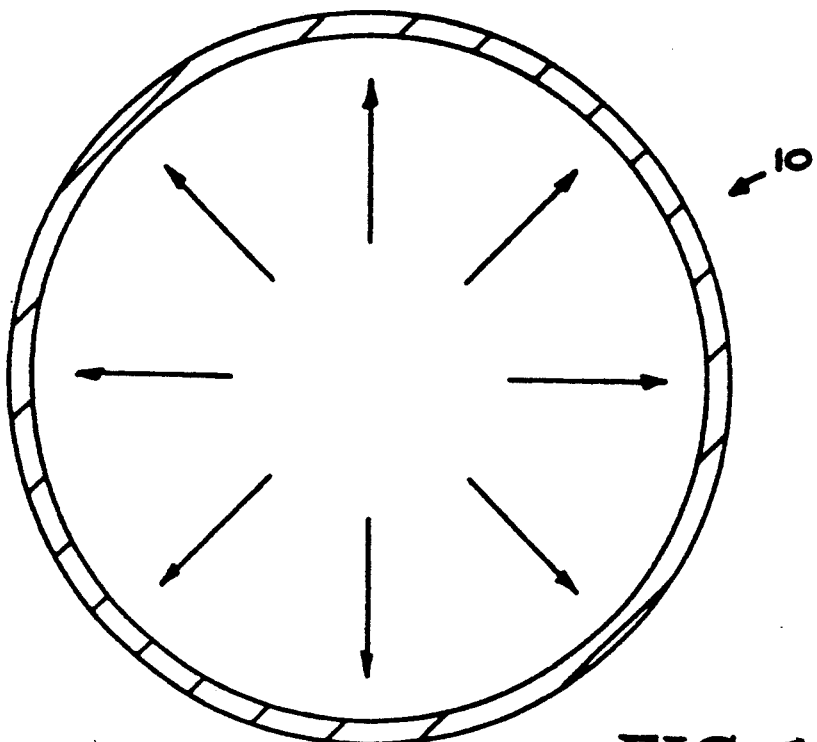
FIG. 1 depicts a cross-sectional view of laser beam generating apparatus known in the prior art.

Referring now to FIG. 1, a cross-sectional view of a laser beam discharge tube 10 is shown. The discharge tube 10 illustrated in FIG. 1 is known in the prior art and need not be described in any great detail, other than to point out several general observations. For purposes of discussion, the term "chevron effect" will be used for describing the generation of non-uniform pulses, as previously described.

In FIG. 1, the tubular structure contains neon and copper vapor in one typical embodiment. As is known in the art, by application of an electric field to a discharge tube 10 such as shown in FIG. 1, the radial penetration of the electric field from the exterior radially toward the center will result in the generation of laser beam pulses. However, as has been previously discussed, two factors occur which limit the generation of higher magnitude pulses for use with a copper vapor laser. One factor is the gas heating effect which can result in temperature increases from 1500° C. on the exterior of the discharge tube illustrated in FIG. 1 to more than 3000° C. at the center of the tube. Prior work indicates that excessive heating of the center of the discharge tube seriously limits the ultimate usable discharge tube diameter by thermally populating the metastable lower laser level.

Figure 2:
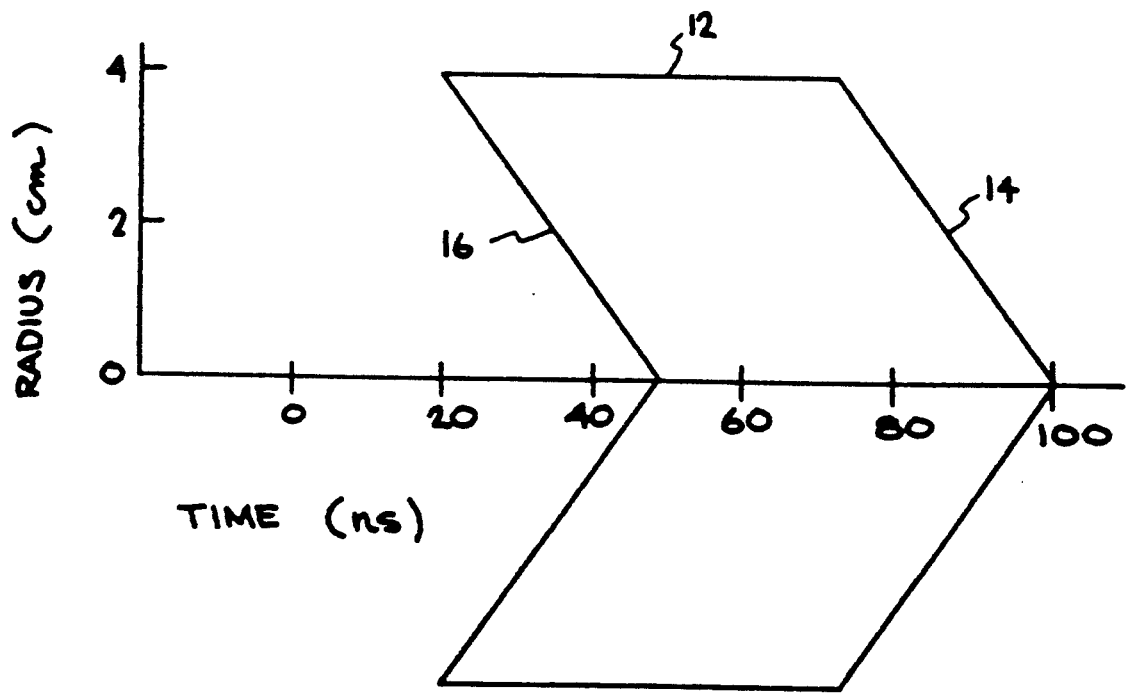
FIG. 2 depicts a diagramic view of a laser beam pulses having the chevron effect.

Another factor which affects the ability to increase power levels in prior art devices is the radial dynamics effect described above. Because the radial penetration of the electric field from the exterior to the center of the discharge tube in prior art devices is not uniform, a "chevron effect" for the laser beam pulses generated is a consequence, which is illustrated in FIG. 2. While for purposes of clarity, a pulse is shown, this pulse actually represents the intensity of the laser beam with respect to time. The X-axis dimensions are in units of nanoseconds (ns) and the Y-axis dimensions for radius are in units of centimeters (cm). As can be seen in FIG. 2, the chevron effect for a series of laser beam pulses 12 results in a generation of a laser beam pulse with the non-uniform cross-sectional area at the leading and trailing edges 14, 16 of the pulse. This can seriously affect the overall operation of any system requiring uniform high power pulses, particularly with the leading and trailing edges.

The present invention addresses both the gas heating problem and radial dynamics problems identified above and provides for a minimizing of the chevron effect as well as further providing for improvement of the gas heating problems, so that higher power capabilities are indeed possible with the present invention.

Referring now to FIG. 3, a cross-sectional view of an improved laser beam generating apparatus is depicted. In FIG. 3, the improved laser beam apparatus 20 includes within the interior of the discharge tube a septum 22 which is carried by one portion of the interior wall 24 of the discharge tube 20. The "septum" aspect of the present invention is depicted in more clear detail in FIG. 4, which is a longitudinal cross-sectional view of a CVL discharge tube 20, clearly indicating a plurality of "septum" segments 22-1, 22-2, . . . 22-N disposed longitudinally within the tube.

In FIG. 4, given a CVL discharge tube length of two meters, each segment 22 is typically 0.06 meters in height and 0.1 meters in width, with an additional 0.05 meters of spacings between each separate segment. However, other variations of the dimensions of the septum segments are possible.

Figure 5:
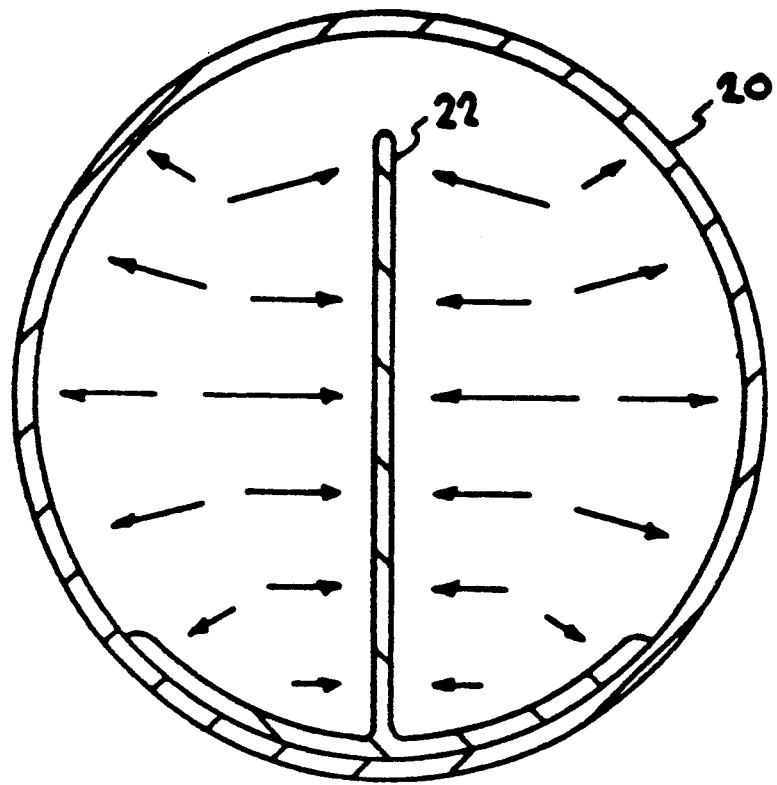
FIG. 5 depicts a cross-sectional view of the present invention illustrating heat dissipation.
Figure 6:
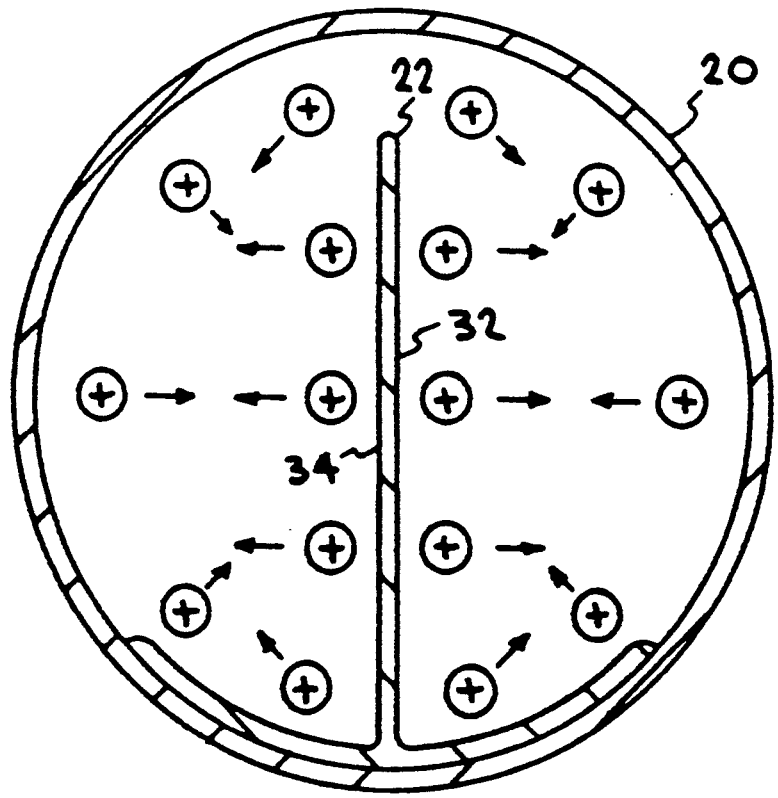
FIG. 6 depicts another cross-sectional view of the present invention illustrating electric field buildup.
Figure 7:
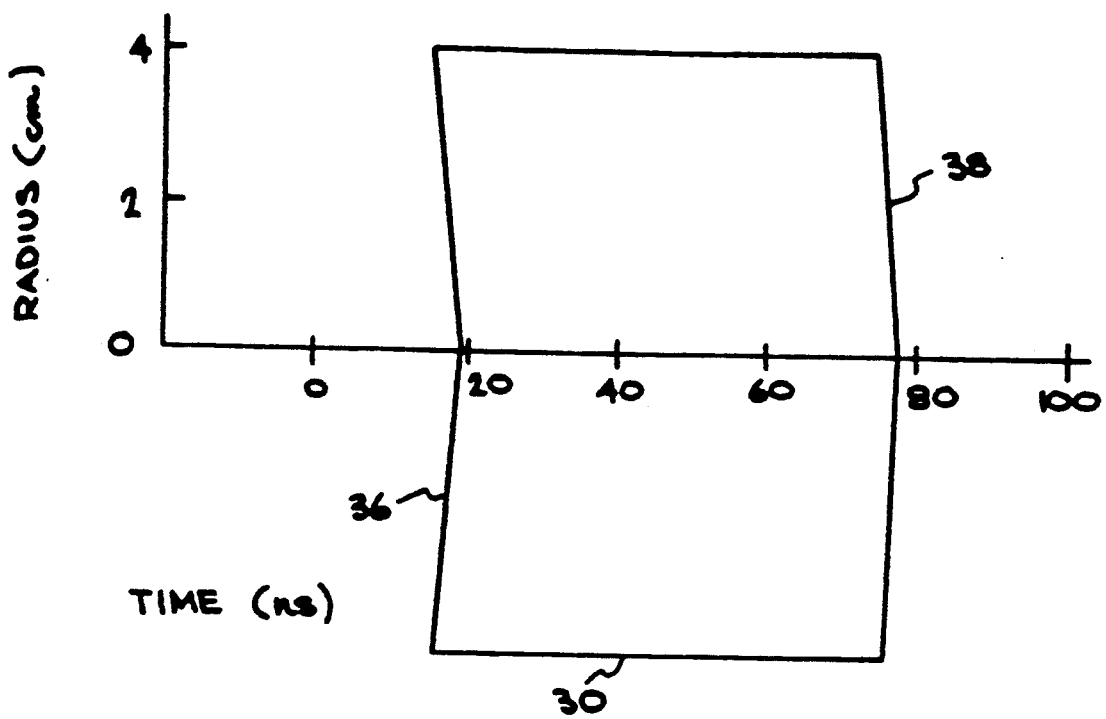
FIG. 7 depicts a diagrammic view of the generation of one laser beam pulse minimizing or eliminating the chevron effect.

The overall advantages of the present invention over that of the prior art are illustrated in more detail in FIGS. 5, 6 and 7. FIG. 5 depicts a cross-sectional view of an improved discharge tube 20 having septum means 22 in which the heat dissipation of the invention is illustrated. FIG. 6 depicts a cross-sectional view of the improved apparatus 20 with the septum illustrating an electric field buildup. Finally, FIG. 7 depicts a diagrammic view illustrating the generation of a series of laser beam pulses 30 according to the present invention in which the chevron effect is minimized or eliminated.

Referring now to FIG. 5, it can be seen that by employing the present invention with the septum aspect, the heat dissipation is radiatively dissipated by virtue of the septum 22 placed at predetermined locations inside the tubular structure 20. This should be contrasted with the prior art heat problem illustrated in FIG. 1. Clearly, the heat dissipation aspect of the invention provides for eliminating the excessive heating problem at the center of the discharge tube so as to overcome the limitation on usable discharge tube diameter by prior art devices as previously discussed.

FIG. 6 depicts an illustration of the present invention showing an electric field buildup where the electric field radially penetrates along the exterior of the discharge tube and along the septum as well. Clearly, the radial penetration of the electric field, as illustrated in FIG. 6, provides for the generation of laser beam pulses in a manner clearly different from that of prior art devices.

Whereas the chevron effect of prior art devices as illustrated in FIG. 2 is caused by radial dynamics, the present invention provides for the generation of laser beam pulses as illustrated in FIG. 7, in which the chevron effect is clearly minimized. The dimensions depicted in FIG. 7 are the same as depicted in FIG. 2 (cm v. ns). The chevron effect is minimized because the septum means contained within the discharge tube, as illustrated in FIGS. 4-6, provides for a radial penetration of the applied electric field within the discharge tube. However, it should be noted that radial penetration is not to the center of the tube, as in prior art approaches, but is rather in different locations. This is because of the electric field buildup on the septum means, as well as on the exterior of the tube. The resulting radial penetration of the electric field is from the exterior of tube 20 to locations 32, 34 as illustrated in FIG. 6, rather than the center of the tube illustrated in FIG. 1.

According to a further aspect of the invention, a slide-in capability is provided herein by which one or more of a plurality of segments can be inserted into a laser discharge tube.

Figure 8A:
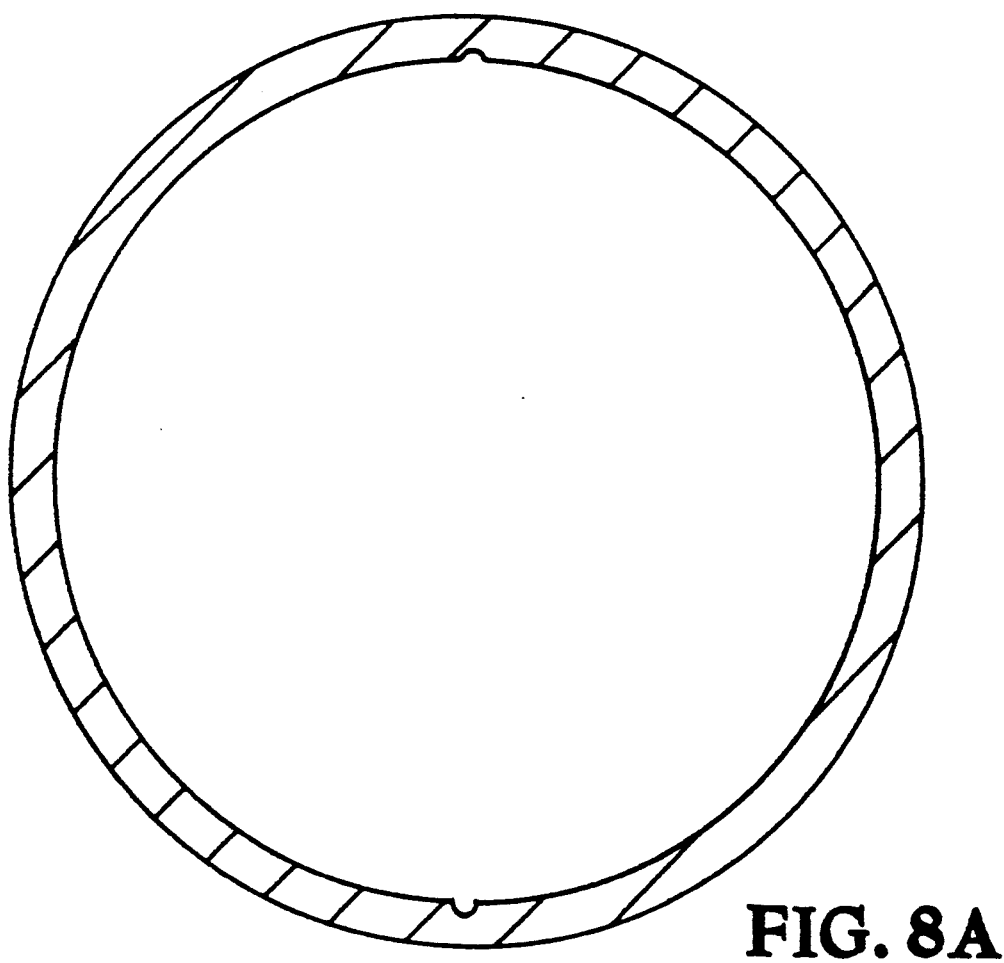
FIGS. 8a, 8b, 9a, and 9b depict cross-sectional views of an improved laser beam generating apparatus using a slide-in capability.
Figure 8B:
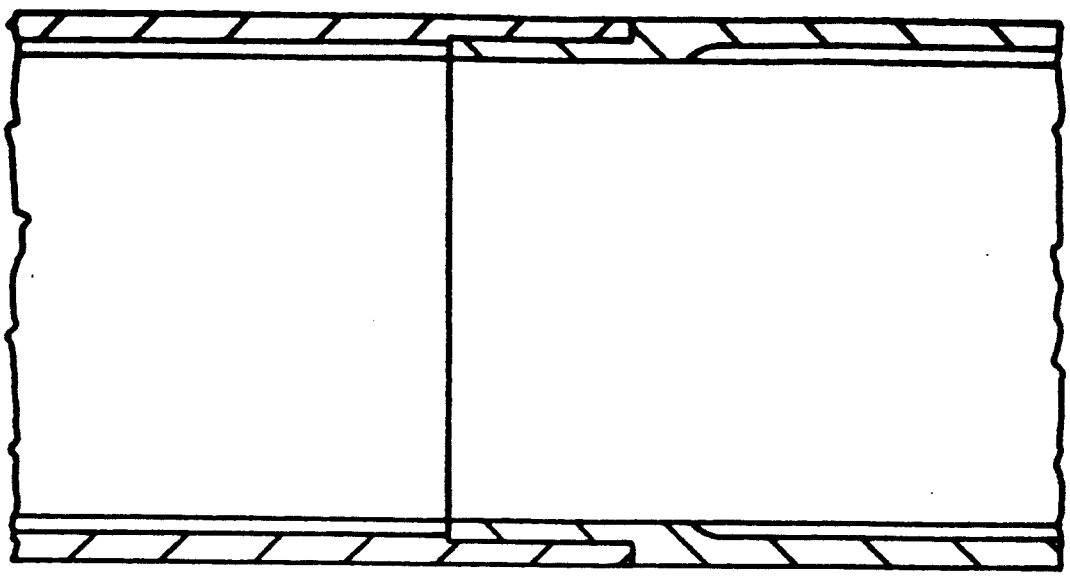

Referring now to FIGS. 8A and 8B, cross-sectional views of a laser discharge tube having a slide-in capability according to the present invention are depicted.

FIG. 8 depicts a cross-sectional view of a laser discharge tube having internal grooves approximately 180 degrees apart and in line with one another. The dimensions depicted in FIG. 8A are for various embodiments (A and B) of a laser discharge tube having dimensions of 3.375 inches and 3.060 inches, respectively.

FIG. 8B depicts a cross-sectional view of a improved laser beam generating apparatus according to the present invention, in which a center section and end section are shown connected together. As described above, the present invention provides a slide-in capability for a segment to be inserted into the laser discharge tube, as will now be described.

Figure 9A:
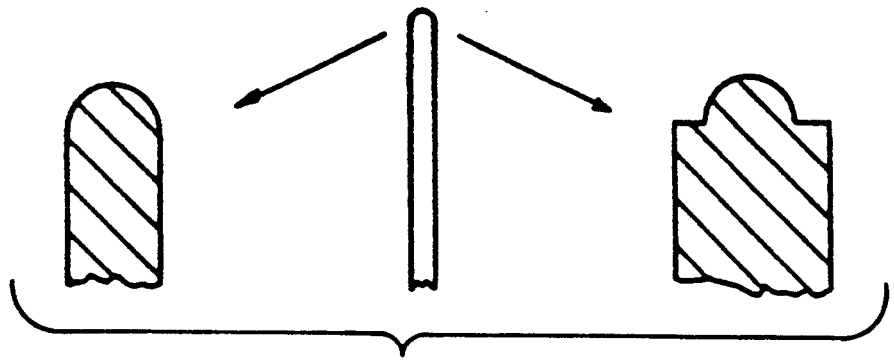
Figure 9B:
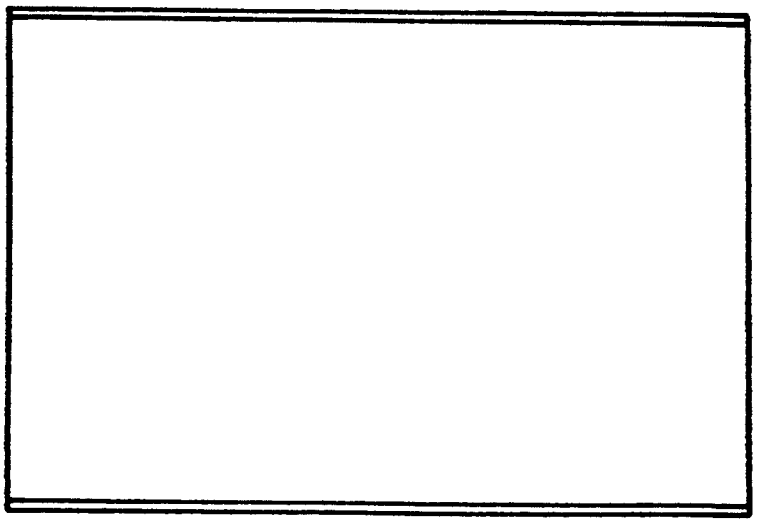

In FIGS. 9A and 9B, cross-sectional views of a segment are shown with the dimensions corresponding to those of FIGS. 8A and 8B (embodiment A and embodiment B). The segment depicted in FIG. 9 is inserted into the laser discharge tube of FIG. 8. The internal groove of FIG. 8 should extend the length of the center section of FIG. 8B and to within 0.500 of the thread zone on each end section of FIG. 8B.

The center section has internal threads and the end section as external threads. The segment must slide into the discharge tube assembly of FIG. 8, and the grooves must be 180 degrees apart and in line when the tube is assembled.

The material used is desirably aluminum oxide (Al$_2$O$_3$) with 99.5% minimum purity.

It has been observed that by providing laser pulse generating apparatus with a "septum" capability, the radial dynamics problem is virtually overcome, thereby permitting larger bore discharge circuits to be implemented. In addition, the heat buildup problem is limited or overcome by implementation of the septum aspect.

Moreover, the overall operation of laser beam apparatus for high power capabilities, while overcoming the discharge tube problems discussed above, does not provide any new problems in terms of suitable operation.

Consequently, the present invention provides dramatic improvement in copper vapor laser applications for much higher power capabilities than prior art approaches.

The foregoing description of the preferred embodiment of the invention is presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention and various embodiments and with various modifications as are suited to the particular use contemplated and it is intended that the scope of the invention be defined by the claims appended hereto.

What is claimed is:

1. Apparatus for generating a series of laser beam pulses, said apparatus comprising
   a generally tubular metal vapor laser structure operating in high temperature ranges for generating said series of laser pulses, said structure including means for applying a pulsating electric field longitudinally to said structure so as to generate said series of laser pulses, said structure further including septum segment means including one or more septum segments disposed longitudinally within the optical path of said tubular laser structure for radiatively dissipating heat buildup at predetermined locations inside said tubular structure and wherein said septum segments include means for sliding said septum segments into said tubular structure so as to provide a slide-in capability relative to said tubular structure.

2. Apparatus for generating a series of laser beam pulses, said apparatus comprising
   a generally tubular metal vapor laser structure operating in high temperature ranges for generating said series of laser pulses, said structure including means for applying a pulsating electric field longitudinally to said structure so as to generate said series of laser pulses, said structure further including septum segment means including one or more septum segments disposed longitudinally within the optical path of said tubular laser structure for cooperating with said structure for generating laser pulses having a relatively uniform intensity pattern with time from the exterior to the interior of said structure for causing each of said pulses to have substantially uniform cross-section along its entire length including its leading and trailing edges whereby to minimize a chevron effect and wherein said septum segments include means for sliding said septum segments into a tubular structure so as to provide a slide-in capability relative to said tubular structure.

3. Apparatus for generating a series of laser beam pulses, said apparatus comprising
   a generally tubular metal vapor laser structure operating in high temperature ranges for generating said series of laser pulses, said structure including means for applying a pulsating electric field longitudinally to said structure so as to generate said series of laser pulses, said structure further including septum segment means including a plurality of septum segments disposed longitudinally within the optical path of said tubular laser structure wherein septum means include one or more septum segments longitudinally disposed within the optical path of said laser structure and wherein said system segments include means for sliding said septum segments into said tubular structure so as to provide a slide-in capability relative to said tubular structure.

4. Apparatus for generating a series of laser beam pulses, said apparatus comprising
   a generally tubular metal vapor laser structure operating in high temperature ranges for generating said series of laser pulses, said structure including means for applying a pulsating electric field longitudinally to said structure so as to generate said series of laser pulses, said structure further including septum segment means including a plurality of septum segments disposed longitudinally within the optical path of said tubular laser structure for radiatively dissipating heat buildup at predetermined locations inside said tubular structure, and
   means for causing each of said pulses to have a substantially uniform cross-sectional intensity pattern along its entire length including its leading and trailing edges whereby to eliminate a chevron effect, said septum means including one or more septum segments longitudinally disposed within said laser structure and wherein said septum segments include means for sliding said septum segments into a tubular structure so as to provide a slide-in capability relative to said tubular structure.

5. In a laser apparatus including a longitudinally extending metal vapor tubular structure operating in high temperature ranges and means for operating within said structure for generating a series of laser beam pulses within said tubular structure, the improvement comprising septum segment means including one or more septum segments disposed longitudinally within the optical path of said tubular laser structures for radiatively dissipating heat buildup at predetermined locations inside said tubular structure for sliding said septum segments into said tubular structure so as to provide a slide-in capability relative to said tubular structure.

6. In a metal vapor laser apparatus including a longitudinally extending tubular structure operating in high temperature ranges and means for operating within said structure for generating a series of laser beam pulses within said tubular structure, the improvement comprising septum segment means including one or more septum segments disposed longitudinally within the optical path of said tubular laser structures associated with said tubular structure for causing each of said pulses to have a substantially uniform cross-section along the entire length including its leading and trailing edges whereby to eliminate a chevron effect and wherein said system segments including means for sliding said septum segments into said tubular structure so as to provide a slide-in capability relative to said tubular structure.

7. In a metal vapor laser apparatus including a longitudinally extending tubular structure operating in high temperature ranges and means for operating within said structure for generating a series of laser beam pulses within said structure for generating a series of laser beam pulses within said tubular structure, the improvement comprising septum segment means including one or more septum segments longitudinally disposed within the optical path of said laser structure and wherein said septum segments include means for sliding said septum segments into said tubular structure so as to provide a slide-in capability relative to said tubular structure.

8. In a metal vapor laser apparatus including a longitudinally extending tubular structure operating in high temperature ranges and means for operating within said structure for generating a series of laser beam pulses within said tubular structure, the improvement comprising septum segment means associated with said tubular structure for causing each of said pulses to have a substantially uniform cross-section along the entire length including its leading and trailing edges whereby to eliminate a chevron effect, and means for radiatively dissipating heat buildup at predetermined locations inside said tubular structure, said septum means including one or more septum segments longitudinally disposed within the optical path of said laser structure and wherein said septum segments include means for sliding said septum segments into said tubular structure so as to provide a slide-in capability relative to said tubular structure.

* * * * *